US012614753B2

(12) United States Patent
Zhang et al.

(10) Patent No.: US 12,614,753 B2
(45) Date of Patent: Apr. 28, 2026

(54) SEMI-SOLID STATE ELECTROLYTE SYSTEM INCLUDING AN OXYSULFIDE SOLID-STATE ELECTROLYTE AND SOLVATE IONIC LIQUID

(71) Applicant: GM GLOBAL TECHNOLOGY OPERATIONS LLC, Detroit, MI (US)

(72) Inventors: Yubin Zhang, Warren, MI (US); Thomas A. Yersak, Royal Oak, MI (US); Aaron Ketchum, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 627 days.

(21) Appl. No.: 18/169,686

(22) Filed: Feb. 15, 2023

(65) Prior Publication Data

US 2024/0274867 A1     Aug. 15, 2024

(51) Int. Cl.
*H01M 10/056*          (2010.01)
*H01M 10/0562*        (2010.01)
*H01M 10/0568*        (2010.01)

(52) U.S. Cl.
CPC ..... *H01M 10/056* (2013.01); *H01M 10/0562* (2013.01); *H01M 10/0568* (2013.01); *H01M 2300/0028* (2013.01); *H01M 2300/0071* (2013.01)

(58) Field of Classification Search
CPC ........... H01M 10/052; H01M 10/0525; H01M 10/056; H01M 10/0562; H01M 10/0568; H01M 50/44; H01M 50/437; H01M 50/491
See application file for complete search history.

(56) References Cited

U.S. PATENT DOCUMENTS

| | | | | | |
|---|---|---|---|---|---|
| 2020/0403267 | A1* | 12/2020 | Li | | H01M 4/131 |
| 2022/0013857 | A1* | 1/2022 | Visco | | C03C 3/321 |
| 2022/0263129 | A1* | 8/2022 | Lu | | H01M 10/0565 |
| 2024/0047822 | A1* | 2/2024 | Evans | | H01M 50/497 |
| 2024/0186499 | A1* | 6/2024 | Shimamoto | | H01M 4/36 |

FOREIGN PATENT DOCUMENTS

| | | | | | |
|---|---|---|---|---|---|
| CN | 110800125 | A * | 2/2020 | | H01M 50/491 |
| EP | 3859862 | A1 * | 8/2021 | | H01M 4/139 |
| WO | WO-2019126977 | A1 * | 7/2019 | | H01M 50/403 |
| WO | WO-2022211106 | A1 * | 10/2022 | | C01G 23/00 |

OTHER PUBLICATIONS

Krauskopf et al., "Physicochemical Concepts of the Lithium Metal Anode in Solid-State Batteries," Chemical Review, vol. 120, pp. 7745-7794, Jul. 27, 2020 (Year: 2020).*

* cited by examiner

*Primary Examiner* — Kevin E Yoon
(74) *Attorney, Agent, or Firm* — Quinn IP Law

(57)          ABSTRACT

A semi-solid-state electrolyte system for use in a battery cell is provided. The semi-solid-state electrolyte system includes an oxysulfide solid-state electrolyte and a secondary electrolyte including a solvate ionic liquid. The semi-solid-state electrolyte system is configured for providing excellent ionic conductivity, supporting high current densities at a low stack pressure, and including excellent chemical stability. The oxysulfide solid-state electrolyte and the solvate ionic liquid are collectively configured for facilitating ion transfer between an anode of the battery cell and a cathode of the battery cell.

18 Claims, 5 Drawing Sheets

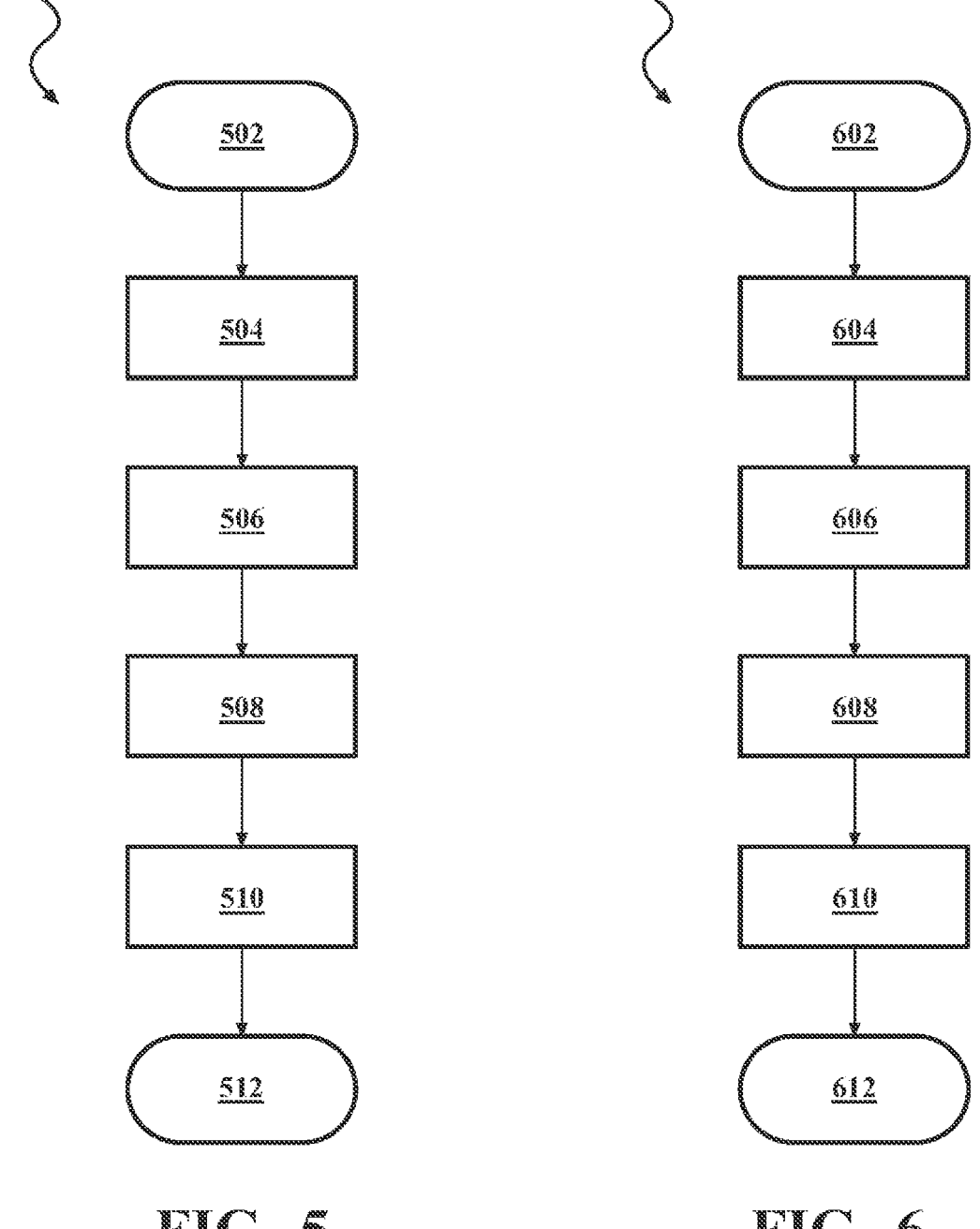
FIG. 5                 FIG. 6

SEMI-SOLID STATE ELECTROLYTE SYSTEM INCLUDING AN OXYSULFIDE SOLID-STATE ELECTROLYTE AND SOLVATE IONIC LIQUID

GOVERNMENT CONTRACT

This application was made with government support under contract no. DE-EE0008857; HP SSE, awarded by the Department of Energy. The government has certain rights in the invention.

BACKGROUND

The disclosure generally relates to a semi-solid electrolyte system including an oxysulfide solid-state electrolyte and solvate ionic liquid.

Lithium-ion batteries and lithium metal batteries are desirable candidates for powering electronic devices in the consumer, automotive, and aerospace industries due to their relatively high energy density, high power density, lack of memory effect, and long cycle life, as compared to other rechargeable battery technologies, including lead-acid batteries, nickel-cadmium and nickel-metal-hydride batteries.

A solid-state battery cell includes a solid electrolyte. The solid electrolyte may include a first planar primary surface which abuts and contacts a planar primary surface of an anode electrode. The solid electrolyte may include a second planar primary surface which abuts and contacts a planar primary surface of a cathode electrode.

SUMMARY

A semi-solid-state electrolyte system for use in a battery cell is provided. The semi-solid-state electrolyte system includes an oxysulfide solid-state electrolyte and a secondary electrolyte including a solvate ionic liquid. The oxysulfide solid-state electrolyte and the solvate ionic liquid are collectively configured for facilitating ion transfer between an anode of the battery cell and a cathode of the battery cell.

In some embodiments, the oxysulfide solid-state electrolyte includes a composition of $xLi_2S \cdot (100-x-y)P_2S_5 \cdot yP_2O_5$. The value x is in a range from 70 molar percentage to 80 molar percentage, and the value y is in a range from 0.5 molar percentage to 10 molar percentage.

In some embodiments, the oxysulfide solid-state electrolyte includes a composition of $xM \cdot (100-x-y)SF \cdot yOF$. The value x is in a range from 40 molar percentage to 80 molar percentage, and the value y is in a range from 0.5 molar percentage to 20 molar percentage). The M is a modifier including $Li_2S$, $Li_2O$, or a combination thereof. The SF is a sulfide former including $P_2S_5$, $SiS_2$, $SnS_2$, $GeS_2$, $B_2S_5$, or a combination thereof. The OF is an oxide former including $P_2O_5$, $SiO_2$, $SnO_2$, $GeO_2$, $B_2O_3$, or $AlO_3$.

In some embodiments, the oxysulfide solid-state electrolyte further includes a dopant present at upon to 30 molar percentage of a total composition. The dopant includes LiI, LiCl, LiBr, $Li_3PO_4$, $Li_2SiO_3$, or $Li_4SiO_4$.

In some embodiments, the solvate ionic liquid includes an LiTFSI salt and triglyme (G3) at a 1:1 molar ratio (Li[G3] TFSI).

In some embodiments, the solvate ionic liquid includes lithium bis(fluorosulfonyl)imide salt and triglyme (G3) (Li (G3)FSI), lithium nitrate salt and G3 ([Li(G3)]NO₃, lithium trifluoroacetate salt and G3 ([Li(G3)]TFA), lithium triflate salt and G3 (Li(G3)OTf), lithium cyano(trifluoromethane-sulfonyl)imide salt and tetraglyme (G4) ([Li(G4)]CTFSI), lithium bis(fluorosulfonyl)imide salt and G4 ([Li(G4)]FSI), lithium bis(trifluoromethanesulfonyl)imide salt and G4 (Li (G4)TFSI), lithium bis(pentafluoroethanesulfonyl)imide salt and G3 ([Li(G4)]BETI), lithium perchlorate salt and G4 ([Li(G4)]ClO₄), lithium tetrafluoroborate salt and G4 ([Li (G4)]BF₄), lithium nitrate salt and G4 ([Li(G4)]NO₃), lithium trifluoroacetate salt and G4 [Li(G4)]TFA, or a combination thereof.

In some embodiments, the combination thereof includes a bi-salt composition or a plurality of solvents.

According to one alternative embodiment, a separator for use in a battery cell is provided. The separator includes a layer of oxysulfide solid-state electrolyte including a plurality of pores and solvate ionic liquid filling a portion of the plurality of pores. The oxysulfide solid-state electrolyte and the solvate ionic liquid are collectively configured for facilitating ion transfer between an anode of the battery cell and a cathode of the battery cell.

In some embodiments, the separator includes a thickness in a range from 1 micron to 100 microns.

In some embodiments, the solid-state electrolyte separator or layer includes a dry porosity in a range from 1% to 40% as a percentage of total volume of the separator.

In some embodiments, the solid-state electrolyte separator or layer includes a dry porosity in a range from 5% to 20% as a percentage of total volume of the separator, and the solvate ionic liquid fills at least 50% of the plurality of pores.

In some embodiments, the solid-state electrolyte separator or layer is reinforced with a filler, and the filler is present in a range from 1% to 20% as a percentage of total weight of the separator. The filler includes a non-woven inorganic glass fiber paper or a poly-para-phenylene terephthalamide fiber.

In some embodiments, the solid-state electrolyte separator or layer is reinforced with a filler, and the filler is present in a range from 4% to 10% as a percentage of total weight of the separator.

In some embodiments, the solid-state electrolyte separator or layer is reinforced with a binder, and the binder is plasticized with solvate ionic liquid. The binder is present in a range from 1% to 20% as a percentage of total weight of the separator. The binder includes a hydrogenated nitrile rubber (HNBR) or a styrene-butadiene rubber (SBR).

In some embodiments, the solid-state electrolyte separator or layer is reinforced with a binder, and the binder is plasticized with solvate ionic liquid. The binder is present in a range from 4% to 10% as a percentage of total weight of the separator.

According to one alternative embodiment, a battery cell including a semi-solid-state electrolyte system is provided. The battery cell includes an anode, a cathode; and a separator. The battery cell further includes the semi-solid-state electrolyte system. The semi-solid-state electrolyte system includes an oxysulfide solid-state electrolyte and a secondary electrolyte including a solvate ionic liquid. The oxysulfide solid-state electrolyte and the solvate ionic liquid are collectively configured for facilitating ion transfer between an anode of the battery cell and a cathode of the battery cell.

In one embodiment, the separator includes a polymer separator body including a plurality of pores, a film of the oxysulfide solid-state electrolyte, and the solvate ionic liquid filling a portion of the plurality of pores.

In one embodiment, the separator includes an oxysulfide solid-state electrolyte body with a plurality of pores.

In one embodiment, the battery cell is configured as a lithium-ion solid-state battery. The separator is the oxysulfide solid-state electrolyte.

In one embodiment, the battery cell is configured as a lithium metal solid-state battery. The separator is the oxysulfide solid-state electrolyte.

In some embodiments, the anode includes graphite, silicon, silicon oxide ($SiO_x$), or a blend thereof.

In some embodiments, the cathode includes lithium nickel manganese cobalt oxide (NCM), nickel cobalt manganese aluminum (NCMA), lithium iron phosphate (LFP), lithium ion manganese oxide (LMO), sulfur (S), iron sulfide ($FeS_2$), titanium disulfide ($TiS_2$), or a blend thereof.

The above features and advantages and other features and advantages of the present disclosure are readily apparent from the following detailed description of the best modes for carrying out the disclosure when taken in connection with the accompanying drawings.

BRIEF DESCRIPTION OF DRAWINGS

FIG. 5 is a flowchart illustrating a method for manufacturing the lithium-ion battery cell of FIG. 1, in accordance with the present disclosure; and FIG. 6 is a flowchart illustrating a method for manufacturing the lithium-ion solid-state battery cell of FIG. 2, in accordance with the present disclosure.

DETAILED DESCRIPTION

Figure 1:
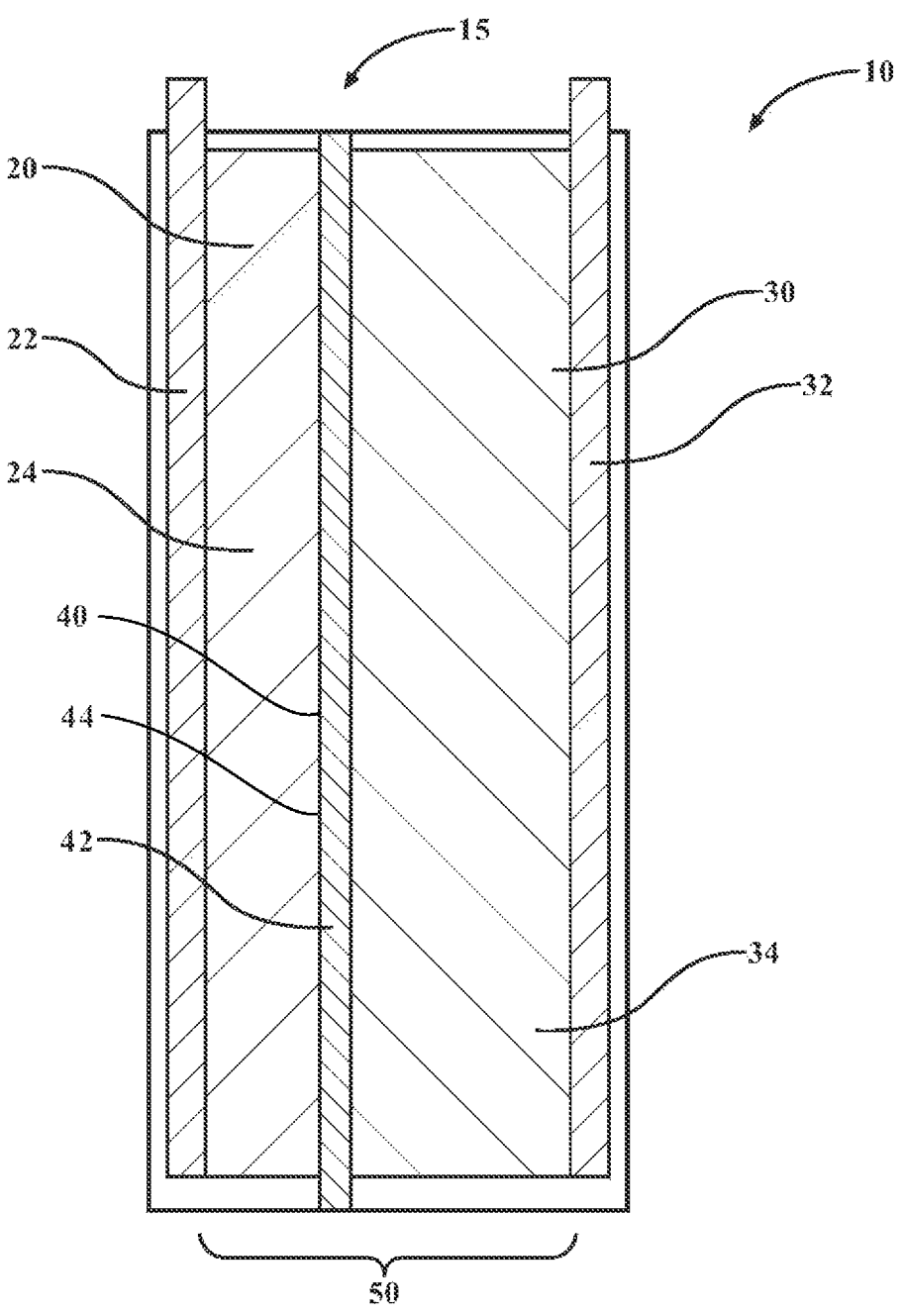
FIG. 1 schematically illustrates an exemplary lithium-ion battery cell including a semi-solid electrolyte system including a porous polymer separator including a polymer separator body and an oxysulfide SSE film and a secondary electrolyte, in accordance with the present disclosure.

A battery system may include a plurality of solid-state battery cells. A solid-state battery cell may include an anode electrode, a cathode electrode, and a solid electrolyte. A battery cell may include an anode electrode, a cathode electrode, and a porous polymer separator with a solid electrolyte film. Alternatively, a battery cell may include an anode electrode, a cathode electrode, and a porous solid electrolyte separator.

A solid-state battery includes a solid electrolyte, which provides for or facilitates ion transfer between the anode electrode and the cathode electrode. The solid electrolyte further acts as a physical separator between the anode electrode and the cathode electrode, thereby preventing internal short circuits within the battery. Solid-state batteries have limitations. A relatively high cell stack pressure may be required to facilitate connectivity between the electrodes and the solid state electrolyte. Ionic conductivity and current density may be limited.

Solid state batteries require a large stack pressure (>3 megapascals (MPa)) to maintain contact between the lithium metal and SSE separator. High stresses are generated at the SSE/lithium interface when lithium deposition is volumetrically confined under a high stack pressure.

A semi-solid electrolyte system that combines an oxysulfide solid-state electrolyte (SSE) and a solvate ionic liquid (SIL) secondary electrolyte for use in a battery cell is provided. The semi-solid electrolyte may be fabricated by applying SIL onto the interface between an oxysulfide SSE film (or pellet) and lithium metal electrode. The SIL fills the pores of the SSE film and provides a compliant interlayer at the Li metal interface. As a result, the semi-solid electrolyte has good ionic conductivity and may support high current densities at low cell stack pressure (<0.1 MPa) without shorting. The semi-solid electrolyte system with oxysulfide SSE includes excellent chemical stability in comparison to a similar electrolyte system with a sulfide SSE. In one embodiment, the disclosed system includes an annealed $Li_3PS_{3.75}O_{0.25}$ oxysulfide SSE and lithium triglyme bis (trifluoromethanesulfonyl)imide ([Li(G3)]TFSI) SIL.

The disclosed semi-solid state electrolyte system may be utilized in a solid-state battery cell, wherein the SSE is a stand-alone layer of the battery cell and serves as the separator for the battery cell, with SIL provided as a secondary electrolyte. The disclosed semi-solid state electrolyte system may be alternatively utilized in a battery cell including a porous polymer separator including a polymer separator body with an SSE film applied to the polymer separator body, with SIL provided as a secondary electrolyte and filling a portion of a plurality of pores .

The disclosed semi-solid electrolyte system provides excellent stability and ionic conductivity. A semi-solid electrolyte composed of oxysulfide SSE and SIL has an ionic conductivity of almost 1 milliSiemens/centimeter and a critical current density of >1 milliamp/square centimeter at 0.1 MPa stack pressure.

Li(G3)TFSI SIL is chemically stable with sulfide SSEs. Chemical stability depends on maintaining a desirable concentration of LiTFSI salt. As the cell ages the salt content may decrease and G3 (triglyme) will be freed to chemically attack sulfide SSE. This may lead to shortened sulfide SSE cell life. Oxysulfide SSEs have improved chemical stability towards SILs with decreased salt content. A semi-solid electrolyte system based on oxysulfide SSEs ensures a solid-state cell may be designed with excellent calendar and cycle life.

Incorporating oxygen into a sulfide SSE over a threshold oxygen concentration oxysulfide SSEs with SIL may be difficult to envision because incorporating oxygen into sulfide SSE tends to decrease ionic conductivity, so these compositions are overlooked. Small concentrations of oxygen may achieve the desired chemical stability effect without reducing ionic conductivity.

In one embodiment, an oxysulfide SSE may include a composition described by $xLi_2S \cdot (100-x-y)P_2S_5 \cdot yP_2O_5$ where (x=70 to 80 molar percentage; y=0.5-10 molar percentage). Oxysulfide SSE compositions may alternatively include $GeS_2$, $B_2S_3$, and $SiS_2$ formers. A modifier may include either $Li_2S$ for Li+ electrolyte.

In another embodiment, an oxysulfide SSE may include a composition of $xM \cdot (100-x-y)SF \cdot yOF$ where (x=40 to 80 molar percentage; y=0.5-20 molar percentage). M is a modifier including $Li_2S$, $Li_2O$, or a combination thereof. The SF is a sulfide former including $P_2S_5$, $SiS_2$, $SnS_2$, $GeS_2$, $B_2S_5$, or a combination thereof. The OF is an oxide former including $P_2O_5$, $SiO_2$, $SnO_2$, $GeO_2$, $B_2O_3$, or $AlO_3$. The oxysulfide solid-state electrolyte may further includes an optional dopant present at upon to 30 molar percentage of a total composition.

Sulfide and oxy-sulfide glasses are formed by combining at least two types of materials: one or more glass formers and one or more glass modifiers. The glass former and the glass modifier may be collectively referred to as a glass forming system. The sulfide or oxy-sulfide glass formation may optionally include combining a dopant with the glass former/s and glass modifier/s. For a sulfide glass, both the glass former and the glass modifier include sulfur. An oxy-sulfide glass may include (i): an oxide forming system (e.g., an oxide-containing glass former and an oxide-containing glass modifier) with a sulfide former; (ii) a sulfide forming system (e.g., a sulfide-containing glass former and a sulfide-containing glass modifier) with an oxide former; (iii) a sulfide forming system with an oxide modifier, (iv) an oxide forming system with a sulfide modifier.

The glass former may include a glass-forming sulfide or oxide. Glass forming sulfides include: $P_2S_5$, $SnS_2$, $GeS_2$, $B_2S_3$, $SiS_2$, and combinations thereof, by way of example. Glass-forming oxides include $SiO_2$, $GeO_2$, $P_2O_5$, $B_2O_3$, $Al_2O_3$, and combinations thereof, by way of example. The glass modifier may also include a sulfide or oxide. Sulfide-containing glass modifiers include $Li_2S$. Oxide-containing glass modifiers include $Li_2O$. For use in batteries with lithium-containing negative electrodes, the glass modifier may include lithium (e.g., $Li_2S$, $Li_2O$). To support advantageous electrolytic activity, at least one of the glass former and the glass modifier may contain sulfur. The dopant may be used to improve glass formability, ionic conductivity, and/or stability. For example, LiI may be added as a dopant to increase lithium-ion conductivity by increasing the amount of free lithium ions in the network. In various aspects, the dopant includes: LiI, $Li_3PO_4$, $Li_4SiO_4$, LiCl, and combinations thereof.

The constituent precursors—namely, the glass former/s and the glass modifier/s—react to form a sulfide or oxy-sulfide glass that enables the formation of mobile alkali metal cations. For convenience, the sulfide and oxy-sulfide glass compositions detailed herein will be described in terms of the atomic proportions of their glass forming system constituents. However, when reacted, the constituent precursors will form glasses having anchored tetrahedral anions with mobile lithium (or sodium) ions. For example, a glass that is formed from 70 mole percent $Li_2S$ glass modifier and 30 mole percent $P_2S_5$ glass former may be described as $70Li_2S$—$30P_2S_5$ and have composition $Li_7P_3S_{11}$ when formed. The glass may include anchored phosphorus sulfide tetrahedral anion structural units ($PS_4^{3-}$) and mobile lithium ions ($Li^+$). As used herein, formulas representing atomic proportion of constituents (e.g., $70Li_2S$—$30P_2S_5$) will be referred to as "empirical formulas," even though they may be further simplified (e.g., $Li_7P_3S_{11}$). Notably, the empirical formulas describe relative proportions of atoms, but do not describe arrangement of atoms or and may not describe quantity of atoms.

The disclosed electrolyte system may include an SIL including lithium bis(trifluoromethanesulfonyl)imide salt (LiTFSI) and triglyme (G3) at 1:1 molar ratio (Li[G3]TFSI). Other SILs that may be utilized include lithium bis(fluorosulfonyl)imide salt and G3 (Li(G3)FSI), lithium nitrate salt and G3 ([Li(G3)]$NO_3$, lithium trifluoroacetate salt and G3 ([Li(G3)]TFA), lithium triflate salt and G3 (Li(G3)OTf), lithium cyano(trifluoromethanesulfonyl)imide salt and G4 ([Li(G4)]CTFSI), lithium bis(fluorosulfonyl)imide salt and G4 ([Li(G4)]FSI), lithium bis(trifluoromethanesulfonyl)imide salt and G4 (Li(G4)TFSI), lithium bis(pentafluoroethanesulfonyl)imide salt and G3 ([Li(G4)]BETI), lithium perchlorate salt and G4 ([Li(G4)]$ClO_4$), lithium tetrafluoroborate salt and G4 ([Li(G4)]$BF_4$), lithium nitrate salt and G4 ([Li(G4)]$NO_3$), lithium trifluoroacetate salt and G4 [Li(G4)]TFA, or combinations therefore (e.g. a bi-salt composition, or a plurality of solvents). G3 refers to triglyme and G4 refers to tetraglyme.

The disclosed semi-solid electrolyte system may be utilized within a lithium-ion battery cell or lithium metal battery cell. A lithium-ion battery cell may include a porous polymer separator.

A catholyte may be defined as an electrolyte used in a cathode composite. A cathode composite may be made with a semi-solid catholyte.

An anolyte is defined as an electrolyte used in an anode composite. An anode composite in a cell without a Li metal anode may be made with a semi-solid anolyte.

The solid-state electrolyte separator or layer may have a thickness in a range from 1 micron to 100 microns. The semi-solid electrolyte operating as a separator may include a dry porosity in a range from 1 percent to 40 percent by total volume of the semi-solid electrolyte. The SIL may fill a significant percentage of the pores. In one embodiment, the SIL may fill a significant percentage of the pores. In one embodiment, the SIL may be present within the pores at a volume percentage of at least 50 percent by total volume of the pores.

The solid-state electrolyte separator or layer may be reinforced with filler. The filler may be present in a range from 1 percent to 20 percent by a total weight of the separator. An exemplary filler may include a non-woven inorganic glass fiber paper or poly(p-phenylene terephthalamide) fiber.

The solid-state electrolyte separator or layer may be reinforced with a binder. The binder may be present in a range from 1 percent by weight to 20 percent by weight as by a total weight of the separator. The binder may be plasticized with SIL. Examples may include hydrogenated acrylonitrile butadiene rubber (HNBR) orstyrene-butadiene rubber (SBR).

The separator may be constructed to include a porous plastic separator with oxysulfide SSE infiltrated into the pores. In a Li-ion battery (LIB), the separator may be a porous polymeric film that is filled with a liquid electrolyte solution.

A solid electrolyte of a semi-solid electrolyte system may operate as a separator, with no separate porous polymer separator.

A secondary electrolyte phase like a SIL reduces a stack pressure of the battery cell and dissipates stresses generated by Li deposition during charging. A semi-solid electrolyte composed of oxysulfide SSE and SIL has an ionic conductivity of almost 1 milliSiemens/centimeter and a critical current density of >1 milliamps/square centimeter at 0.1 MPa stack pressure.

In one embodiment of the disclosure, a battery cell may include the oxysulfide SSE and the SIL. Chemical stability of this embodiment evaluated as a function of composition as described by the following: $xLi_2S \cdot (100-x-y)P_2S_5 \cdot yP_2O_5$; (x=70, 75; y=0, 2, 5, 10); $Li(G3)_z$ TFSI; (z=1-4). Oxysulfide SSEs provide excellent chemical stability under a wide range of conditions. For example, Li(G3)TFSI, when utilized in combination with the disclosed SSE, provides excellent chemical stability. In embodiments wherein z is greater than 1, oxysulfide SSEs exhibit excellent chemical stability compared to sulfide SSEs. Chemical stability is increased with embodiments exhibiting by increasing y values. In another embodiment, wherein x=75, oxysulfide SSEs exhibit excellent chemical stability. In certain embodiments, ionic conductivity of oxysulfide SSEs with x=75 exhibit excellent ionic conductivity. Annealed $Li_3PS_{3.75}O_{0.25}$ exhibits high ionic conductivity of 1.119 milliSiemens/centimeter at room temperature.

Semi-solid electrolyte with $Li(G_3)TFSI$ and an annealed $Li_3PS_{3.75}O_{0.25}$ SSE has ionic conductivity of 0.703 milli-Siemens/centimeter and critical current density (CCD) of 1.8 milliamps/square centimeter. CCD may be defined as the current density that causes a failure mode, such as an internal short or an electrode contact loss.

According to a first embodiment, a semi-solid-state electrolyte system for use in a battery cell is provided. The semi-solid-state electrolyte system includes an oxysulfide solid-state electrolyte and a secondary electrolyte including a solvate ionic liquid. The oxysulfide solid-state electrolyte and the solvate ionic liquid are collectively configured for facilitating ion transfer between an anode of the battery cell and a cathode of the battery cell.

The oxysulfide solid-state electrolyte may include a composition of $xLi_2S \cdot (100-x-y)P_2S_5 \cdot yP_2O_5$. The value x may be in a range from 70 molar percentage to 80 molar percentage, and the value y may be in a range from 0.5 molar percentage to 10 molar percentage.

The oxysulfide solid-state electrolyte may include a composition of $xM \cdot (100-x-y)SF \cdot yOF$. The value x may be in a range from 40 molar percentage to 80 molar percentage, and the value y may be in a range from 0.5 molar percentage to 20 molar percentage). The M may be a modifier including $Li_2S$, $Li_2O$, or a combination thereof. The SF may be a sulfide former including $P_2S_5$, $SiS_2$, $SnS_2$, $GeS_2$, $B_2S_5$, or a combination thereof. The OF may be an oxide former including $P_2O_5$, $SiO_2$, $SnO_2$, $GeO_2$, $B_2O_3$, or $AlO_3$.

The oxysulfide solid-state electrolyte may further include a dopant present at upon to 30 molar percentage of a total composition. The dopant may include LiI, LiCl, LiBr, $Li_3PO_4$, $Li_2SiO_3$, or $Li_4SiO_4$.

The solvate ionic liquid may include an LiTFSI salt and triglyme (G3) at a 1:1 molar ratio (Li[G3]TFSI).

The solvate ionic liquid may include lithium bis(fluorosulfonyl)imide salt and triglyme (G3) (Li(G3)FSI), lithium nitrate salt and G3 ([Li(G3)]NO$_3$, lithium trifluoroacetate salt and G3 ([Li(G3)]TFA), lithium triflate salt and G3 (Li(G3)OTf), lithium cyano(trifluoromethanesulfonyl)imide salt and tetraglyme (G4) ([Li(G4)]CTFSI), lithium bis(fluorosulfonyl)imide salt and G4 ([Li(G4)]FSI), lithium bis(trifluoromethanesulfonyl)imide salt and G4 (Li(G4)TFSI), lithium bis(pentafluoroethanesulfonyl)imide salt and G3 ([Li(G4)]BETI), lithium perchlorate salt and G4 ([Li(G4)]ClO$_4$), lithium tetrafluoroborate salt and G4 ([Li(G4)]BF$_4$), lithium nitrate salt and G4 ([Li(G4)]NO$_3$), lithium trifluoroacetate salt and G4 [Li(G4)]TFA, or a combination thereof.

The combination thereof includes a bi-salt composition or a plurality of solvents.

According to a second embodiment, a separator for use in a battery cell is provided. The separator includes a layer of oxysulfide solid-state electrolyte including a plurality of pores and solvate ionic liquid filling a portion of the plurality of pores. The oxysulfide solid-state electrolyte and the solvate ionic liquid are collectively configured for facilitating ion transfer between an anode of the battery cell and a cathode of the battery cell.

The separator may include a thickness in a range from 1 micron to 100 microns.

The separator may include a dry porosity in a range from 1% to 40% as a percentage of total volume of the separator.

The separator may include a dry porosity in a range from 5% to 20% as a percentage of total volume of the separator, and the solvate ionic liquid may fill at least 50% of the plurality of pores.

The separator may be reinforced with a filler, and the filler may be present in a range from 1% to 20% as a percentage of total weight of the separator. The filler may include a non-woven inorganic glass fiber paper or a poly-para-phenylene terephthalamide fiber.

The separator may be reinforced with a filler, and the filler may be present in a range from 4% to 10% as a percentage of total weight of the separator.

The separator may be reinforced with a binder, and the binder may be plasticized with the solvate ionic liquid. The binder may be present in a range from 1% to 20% as a percentage of total weight of the separator. The binder may include a hydrogenated nitrile rubber (HNBR) or a styrene-butadiene rubber (SBR).

The separator may be reinforced with a binder, and the binder may be plasticized with the solvate ionic liquid. The binder may be present in a range from 4% to 10% as a percentage of total weight of the separator.

According to a third embodiment, a battery cell including a semi-solid-state electrolyte system is provided. The battery cell includes an anode, a cathode; and a separator. The battery cell further includes the semi-solid-state electrolyte system. The semi-solid-state electrolyte system includes an oxysulfide solid-state electrolyte and a secondary electrolyte including a solvate ionic liquid. The oxysulfide solid-state electrolyte and the solvate ionic liquid are collectively configured for facilitating ion transfer between an anode of the battery cell and a cathode of the battery cell.

The separator may include a polymer separator body including a plurality of pores, a film of the oxysulfide solid-state electrolyte, and the solvate ionic liquid filling a portion of the plurality of pores.

The battery cell may be configured as a lithium-ion solid-state battery. The separator may be the oxysulfide solid-state electrolyte.

The battery cell may be configured as a lithium metal solid-state battery. The separator may be the oxysulfide solid-state electrolyte.

The anode may include graphite, silicon, silicon oxide (SiO$_x$), or a blend thereof.

The cathode may include lithium nickel manganese cobalt oxide (NCM), nickel cobalt manganese aluminum (NCMA), lithium iron phosphate (LFP), lithium-ion manganese oxide (LMO), sulfur (S), iron sulfide (FeS$_2$), titanium disulfide (TiS$_2$), or a blend thereof.

FIG. 1 schematically illustrates an exemplary lithium-ion battery cell 10 including a semi-solid electrolyte system 15 including a porous polymer separator 40 including a polymer separator body 42 and an oxysulfide SSE film 44 and a secondary electrolyte 50. The secondary electrolyte fills a portion of a plurality of pores of the porous polymer separator 40. The secondary electrolyte 50 includes a solvate ionic liquid (SIL) electrolyte as described herein. The lithium-ion battery cell 10 is further illustrated including an anode 20 including an anode current collector 22 and an anode electrode 24. The anode electrode 24 may include anode active materials, conductive materials, and binder materials. The lithium-ion battery cell 10 is further illustrated including a cathode 30 including a cathode current collector 32 and a cathode electrode 34. The cathode electrode 34 may include cathode active materials, conductive materials, and binder materials. The anode electrode 24 and/or the cathode electrode 34 may include oxysulfide SSE particles. The secondary electrolyte 50 is illustrated in contact with and being present within each of the anode 20, the cathode 30, and the porous polymer separator 40. The oxysulfide SSE particles filled within pores of the porous polymer separator 40 and the secondary electrolyte 50 collectively provide for ion transfer between the anode 20 and the cathode 30. The semi-solid electrolyte system 15 operates as described herein, providing excellent ionic conductivity, supporting high current densities at a low stack pressure (<0.1 MPa), and including excellent chemical stability.

Figure 2:
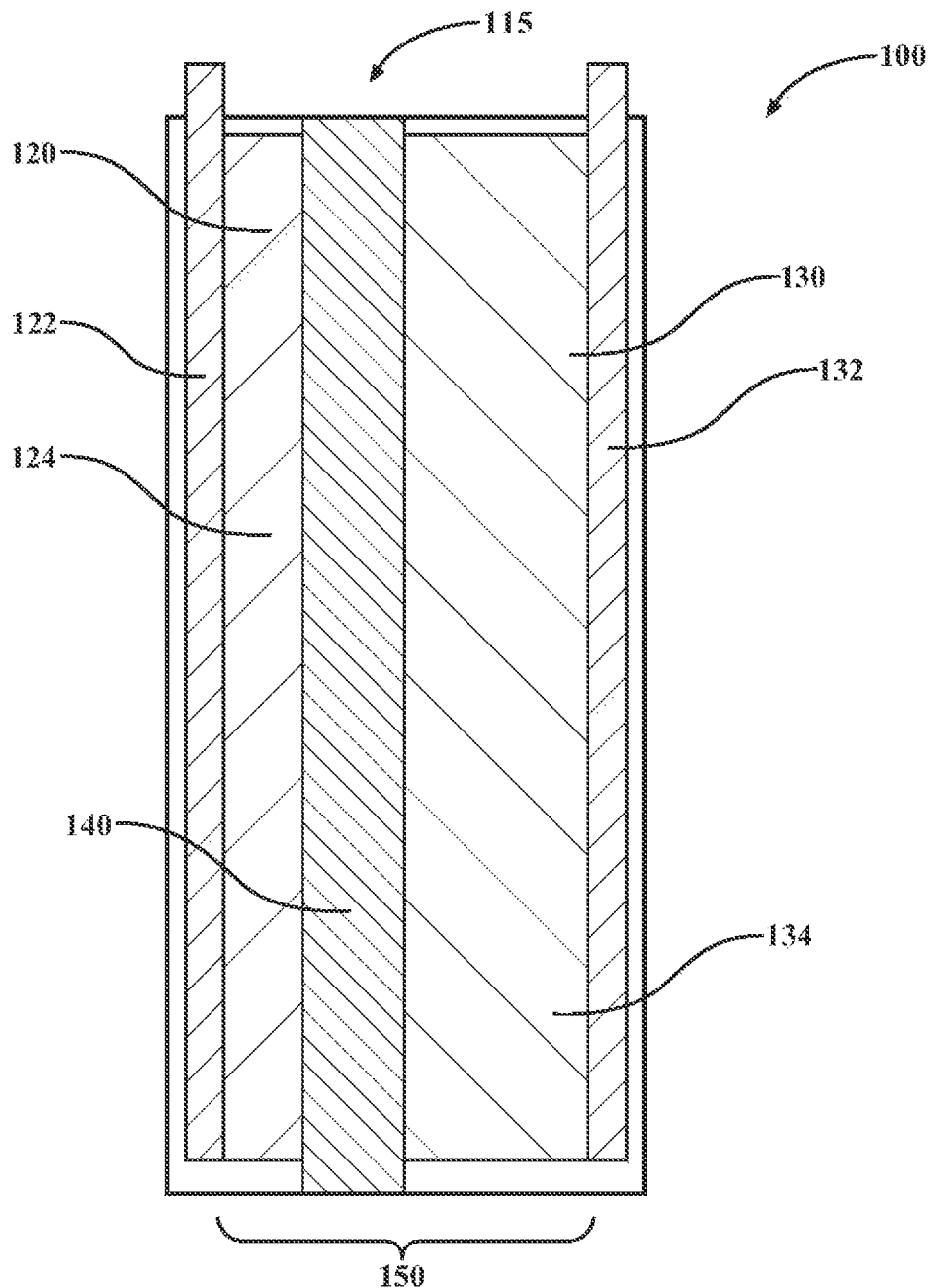
FIG. 2 schematically illustrates an exemplary lithium-ion solid-state battery cell including a semi-solid electrolyte system including an oxysulfide SSE layer and a secondary electrolyte, in accordance with the present disclosure.

FIG. 2 schematically illustrates an exemplary lithium-ion solid-state battery cell 100 including a semi-solid electrolyte system 115 including an oxysulfide SSE layer 140 and a secondary electrolyte 150. The secondary electrolyte 150 includes a SIL electrolyte as described herein. The lithium-ion solid-state battery cell 100 is further illustrated including an anode 120 including an anode current collector 122 and an anode electrode 124. The lithium-ion battery cell 100 is further illustrated including a cathode 130 including a cathode current collector 132 and a cathode electrode 134. The anode electrode 124 and/or the cathode electrode 134 may include oxysulfide SSE particles. The secondary electrolyte 150 is illustrated in contact with and being present within pores or internal spaces of each of the anode 120, the cathode 130, and the oxysulfide SSE layer 140. The oxysulfide SSE layer 140 and the secondary electrolyte 150 collectively provide for ion transfer between the anode 120 and the cathode 130. The semi-solid electrolyte system 115 operates as described herein, providing excellent ionic conductivity, supporting high current densities at a low stack pressure (<0.1 MPa), and including excellent chemical stability.

Figure 3:
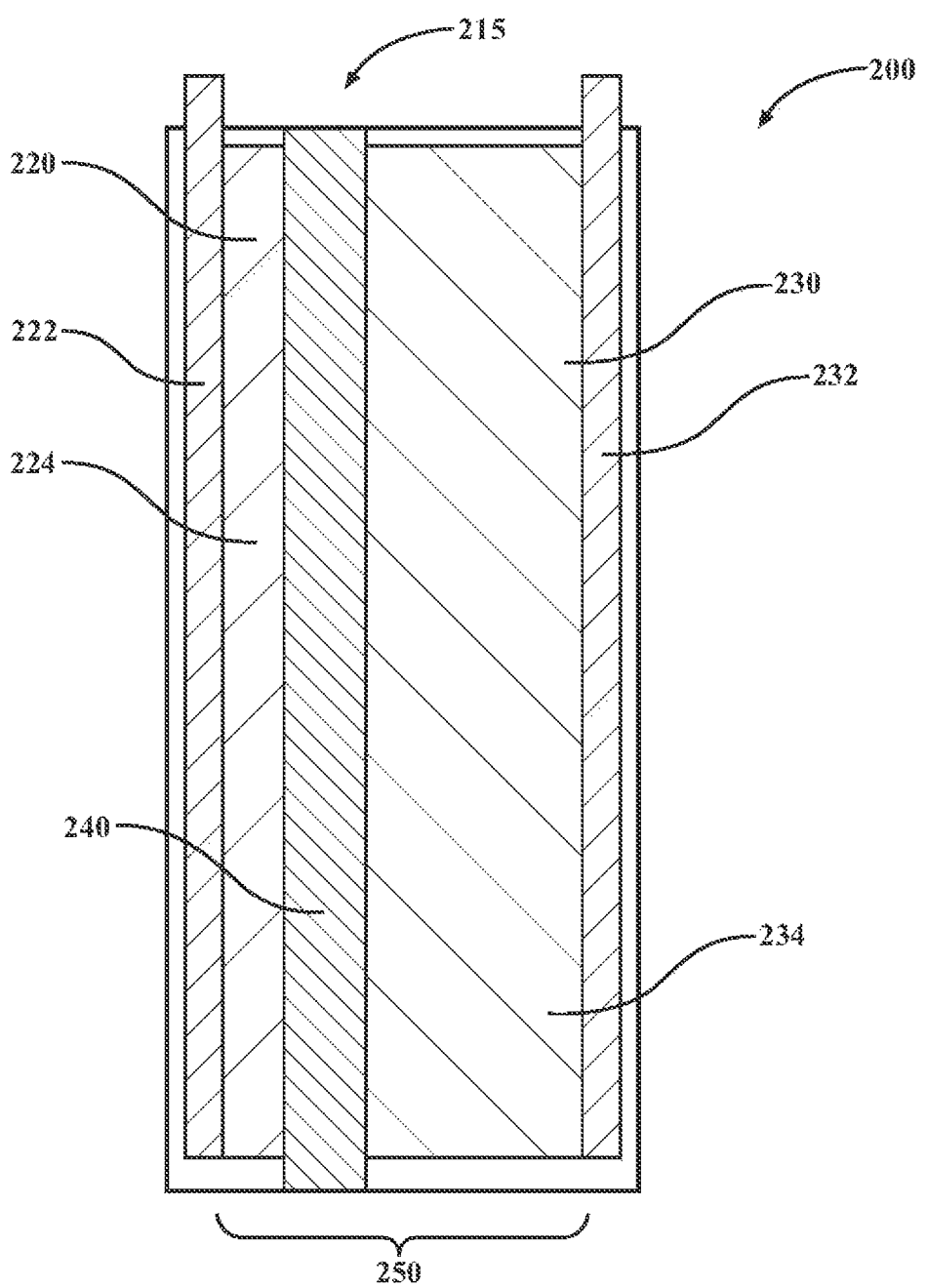
FIG. 3 schematically illustrates an exemplary lithium metal solid-state battery cell including a semi-solid electrolyte system including an oxysulfide SSE layer and a secondary electrolyte, in accordance with the present disclosure.

FIG. 3 schematically illustrates an exemplary lithium metal solid-state battery cell 200 including a semi-solid electrolyte system 215 including an oxysulfide SSE layer 240 and a secondary electrolyte 250. The secondary electrolyte 250 includes a SIL electrolyte as described herein. The lithium metal solid-state battery cell 200 is further illustrated including an anode 220 including an anode current collector 222 and an anode electrode 224. The lithium-ion battery cell 200 is further illustrated including a cathode 230 including a cathode current collector 232 and a cathode electrode 234. The cathode electrode 234 may include oxysulfide SSE particles. The secondary electrolyte 250 is illustrated in contact with each of the anode 220, the cathode 230, and the oxysulfide SSE layer 240 and being present within pores or internal spaces of the cathode 230 and the oxysulfide layer 240. The oxysulfide SSE layer 240 and the secondary electrolyte 250 collectively provide for ion transfer between the anode 220 and the cathode 230. The semi-solid electrolyte system 215 operates as described herein, providing excellent ionic conductivity, supporting high current densities at a low stack pressure (<0.1 MPa), and including excellent chemical stability.

Figure 4:
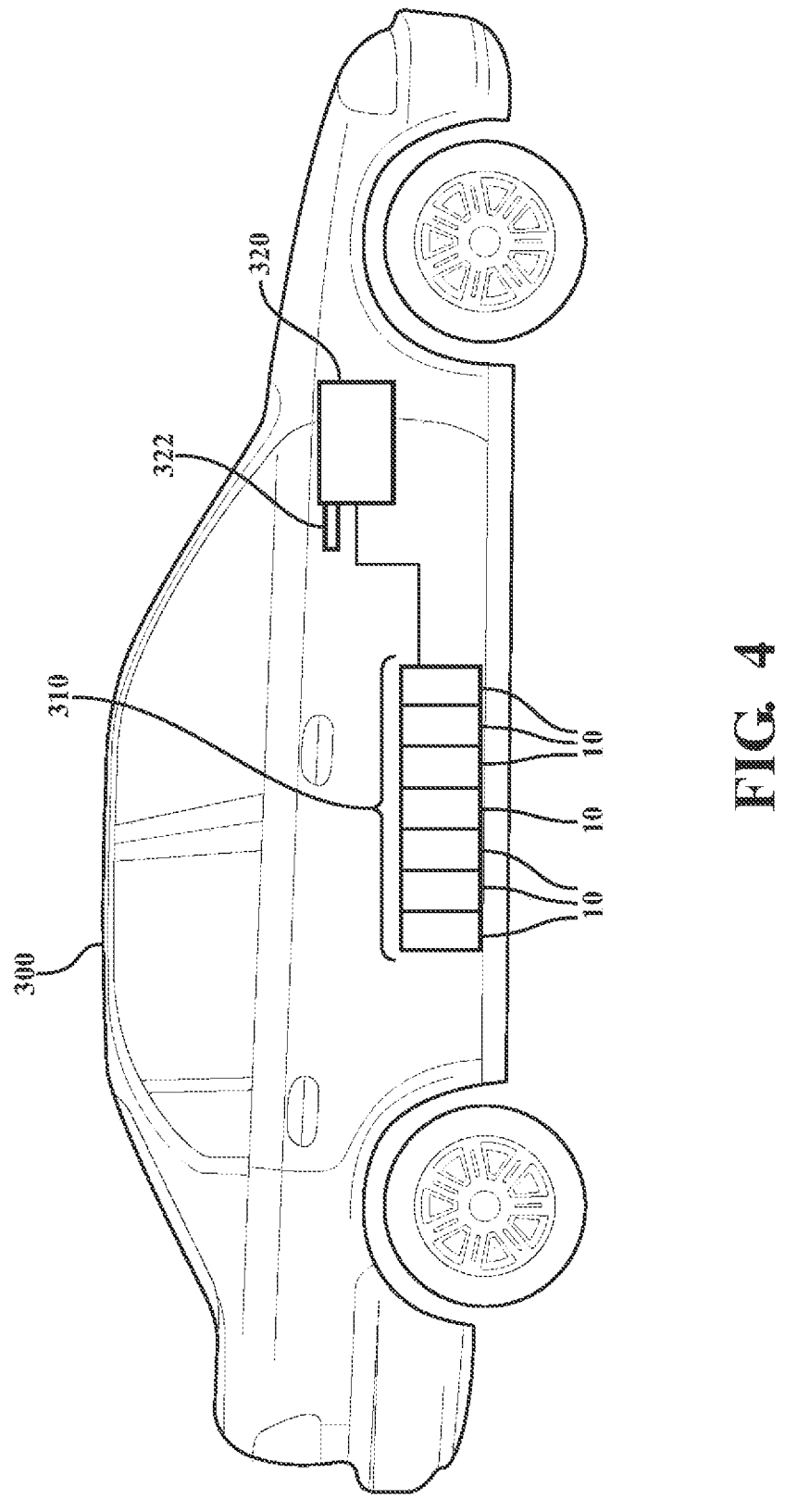
FIG. 4 schematically illustrates an exemplary device, e.g., a battery electric vehicle (BEV), including a battery pack that includes a plurality of lithium-ion battery cells, in accordance with the present disclosure.

The battery cells 10, 100, 200 may be utilized in a wide range of applications and powertrains. FIG. 4 schematically illustrates an exemplary device 300, e.g., a battery electric vehicle (BEV), including a battery pack 310 that includes a plurality of lithium-ion battery cells 10. The battery pack 310 may alternatively include a plurality of lithium-ion solid-state battery cells 100 of FIG. 2 or a plurality of lithium metal solid-state battery cells 200 of FIG. 3. The plurality of battery cells 10 may be connected in various combinations, for example, with a portion being connected in parallel and a portion being connected in series, to achieve goals of supplying electrical energy at a desired voltage. The battery pack 310 is illustrated as electrically connected to a motor generator unit 320 useful to provide motive force to the device 300. The motor generator unit 320 may include an output component 322, for example, an output shaft, which is provided mechanical energy useful to provide the motive force to the device 300. A number of variations to device 300 are envisioned, for example, including a powertrain, a boat, or an airplane, and the disclosure is not intended to be limited to the examples provided.

FIG. 5 is a flowchart illustrating a method 400 for manufacturing the lithium-ion battery cell 10 of FIG. 1. While the method 400 is described in relation to the battery cell 10 of FIG. 1, the method 400 may similarly be applied in relation to other similar battery cell configurations. The method 400 starts at step 402. At step 404, a porous polymer separator 40 is prepared including a process to fill pores of the porous polymer separator 40 with oxysulfide SSE particles. At step 406, an anode 20 and a cathode 30 are disposed within a case or enclosure of the battery cell 10. At step 408, the porous polymer separator 40 is disposed between the anode 20 and the cathode 30. At step 410, the secondary electrolyte 50 including SIL is disposed within the battery cell 10 and is in contact with each of the anode 20, the cathode 30, and the porous polymer separator 40, and the battery cell 10 is closed and further prepared for use. After step 410, the battery cell may be operational. At step 412, the method 400 ends. The method 400 is an exemplary method or process to manufacture the disclosed battery cell 10. A number of additional and/or alternative method steps are envisioned, and the disclosure is not intended to be limited to the examples provided herein.

FIG. 6 is a flowchart illustrating a method 500 for manufacturing the lithium-ion solid-state battery cell 100 of FIG. 2. While the method 500 is described in relation to the battery cell 100 of FIG. 1, the method 500 may similarly be applied in relation to the lithium metal solid-state battery cell 200 of FIG. 3 or other similar battery cell configurations. The method 500 starts at step 502. At step 504, an anode 120 and a cathode 130 are disposed within a case or enclosure of the battery cell 100. At step 506, an oxysulfide SSE layer 140 is disposed between the anode 120 and the cathode 130. At step 508, the secondary electrolyte 150 is disposed within the battery cell 100 and is in contact with each of the anode 120, the cathode 130, and the oxysulfide SSE layer 140. At step 510, the battery cell 100 may be closed and pressurized to an operating pressure (<0.1 MPa). After step 510, the battery cell may be operational. At step 512, the method 500 ends. The method 500 is an exemplary method or process to manufacture the disclosed battery cell 100. A number of additional and/or alternative method steps are envisioned, and the disclosure is not intended to be limited to the examples provided herein.

While the best modes for carrying out the disclosure have been described in detail, those familiar with the art to which this disclosure relates will recognize various alternative designs and embodiments for practicing the disclosure within the scope of the appended claims.

The invention claimed is:

1. A semi-solid-state electrolyte system for use in a battery cell, comprising:

an oxysulfide solid-state electrolyte; and a secondary electrolyte including a solvate ionic liquid; and wherein the oxysulfide solid-state electrolyte and the solvate ionic liquid are collectively configured for facilitating ion transfer between an anode of the battery cell and a cathode of the battery cell;

wherein the oxysulfide solid-state electrolyte includes a composition of $xM \cdot (100-x-y)SF \cdot yOF$;

wherein x is in a range from 40 molar percentage to 80 molar percentage and y is in a range from 5 molar percentage to 20 molar percentage;

wherein M is a modifier including $Li_2S$, $Li_2O$, or a combination thereof;

wherein SF is a sulfide former including $P_2S_5$, $SiS_2$, $SnS_2$, $GeS_2$, $B_2S_5$, or a combination thereof;

wherein OF is an oxide former including $P_2O_5$, $SiO_2$, $SnO_2$, $GeO_2$, $B_2O_3$, or $AlO_3$; and wherein the oxysulfide solid-state electrolyte comprises annealed $Li_3PS_{3.75}O_{0.25}$ with x=75 and an ionic conductivity equal to 1.119 milliSiemens/centimeter at room temperature.

2. The semi-solid-state electrolyte system of claim 1, wherein the oxysulfide solid-state electrolyte further includes a dopant present at upon to 30 molar percentage of a total composition; and wherein the dopant includes LiI, LiCl, LiBr, $Li_3PO_4$, $Li_2SiO_3$, or $Li_4SiO_4$.

3. The semi-solid-state electrolyte system of claim 1, wherein the solvate ionic liquid includes a LiTFSI salt and triglyme (G3) at a 1:1 molar ratio (Li[G3]TFSI).

4. The semi-solid-state electrolyte system of claim 1, wherein the solvate ionic liquid includes lithium bis(fluorosulfonyl)imide salt and triglyme (G3) (Li(G3)FSI), lithium nitrate salt and G3 ([Li(G3)]$NO_3$, lithium trifluoroacetate salt and G3 ([Li(G3)]TFA), lithium triflate salt and G3 (Li(G3)OTf), lithium cyano(trifluoromethanesulfonyl) imide salt and tetraglyme (G4) ([Li(G4)]CTFSI), lithium bis(fluorosulfonyl)imide salt and G4 ([Li(G4)]FSI), lithium bis(trifluoromethanesulfonyl)imide salt and G4 (Li(G4) TFSI), lithium bis(pentafluoroethanesulfonyl)imide salt and G3 ([Li(G4)]BETI), lithium perchlorate salt and G4 ([Li (G4)]$ClO_4$), lithium tetrafluoroborate salt and G4 ([Li(G4)] $BF_4$), lithium nitrate salt and G4 ([Li(G4)]$NO_3$), lithium trifluoroacetate salt and G4 [Li(G4)]TFA, or a combination thereof.

5. The semi-solid-state electrolyte system of claim 4, wherein the combination thereof includes a bi-salt composition or a plurality of solvents.

6. The semi-solid-state electrolyte system of claim 1, wherein the oxysulfide solid-state electrolyte has an ionic conductivity<1 milliSiemens/centimeter and a critical current density>1 milliamp/square centimeter at a stack pressure=0.1 MPa.

7. The semi-solid-state electrolyte system of claim 1, wherein the oxysulfide solid-state electrolyte comprises lithium bis (trifluoromethanesulfonyl) imide salt (LiTFSI) and triglyme (G3) at 1:1 molar ratio (Li[G3]TFSI), and annealed $Li_3PS_{3.75}O_{0.25}$ with an ionic conductivity equal to 0.703 milliSiemens/centimeter and a critical current density (CCD) equal to 1.8 milliamps/square centimeter.

8. A separator for use in a battery cell, comprising a layer of oxysulfide solid-state electrolyte including a plurality of pores; and solvate ionic liquid filling a portion of the plurality of pores; and wherein the oxysulfide solid-state electrolyte and the solvate ionic liquid are collectively configured for facilitating ion transfer between an anode of the battery cell and a cathode of the battery cell;

wherein the separator is reinforced with a filler;

wherein the filler is present in a range from 1% to 20% as a percentage of total weight of the separator;

wherein the filler includes a non-woven inorganic glass fiber paper;

wherein the solvate ionic liquid comprises lithium bis (trifluoromethanesulfonyl)imide salt (LiTFSI) and triglyme (G3) at a 1:1 molar ratio (Li[G3]TFSI), and wherein the oxysulfide solid-state electrolyte comprises annealed $Li_3PS_{3.75}O_{0.25}$ with an ionic conductivity equal to 0.703 milliSiemens/centimeter and a critical current density (CCD) equal to 1.8 milliamps/square centimeter.

9. The separator of claim 8, wherein the separator includes a thickness in a range from 1 micron to 100 microns.

10. The separator of claim 8, wherein the separator includes a dry porosity in a range from 1% to 40% as a percentage of total volume of the separator.

11. The separator of claim 8, wherein the separator includes a dry porosity in a range from 5% to 20% as a percentage of total volume of the separator; and wherein the solvate ionic liquid fills at least 50% of the plurality of pores.

12. The separator of claim 8, wherein the separator is reinforced with a binder;

wherein the binder is plasticized with the solvate ionic liquid;

wherein the binder is present in a range from 1% to 20% as a percentage of total weight of the separator; and wherein the binder includes a hydrogenated nitrile rubber (HNBR) or a styrene-butadiene rubber (SBR).

13. The separator of claim 8, wherein the separator is reinforced with a binder;

wherein the binder is plasticized with the solvate ionic liquid; and wherein the binder is present in a range from 4% to 10% as a percentage of total weight of the separator.

14. A battery cell including a semi-solid-state electrolyte system, the battery cell comprising:

an anode;

a cathode;

a separator disposed in-between the anode and the cathode; and the semi-solid-state electrolyte system, including:

an oxysulfide solid-state electrolyte; and a secondary electrolyte including a solvate ionic liquid; and wherein the oxysulfide solid-state electrolyte and the solvate ionic liquid are collectively configured for facilitating ion transfer between the anode and the cathode;

wherein the separator includes:

a polymer separator body including a plurality of pores;

a film, comprising the oxysulfide solid-state electrolyte, covering an anode side of the polymer separator body;

the solvate ionic liquid filling a portion of the plurality of pores;

wherein the solvate ionic liquid comprises lithium bis (trifluoromethanesulfonyl)imide salt (LiTFSI) and triglyme (G3) at 1:1 molar ratio (Li[G3]TFSI), and wherein the oxysulfide solid-state electrolyte comprises annealed $Li_3PS_{3.75}O_{0.25}$ with an ionic conductivity equal to 0.703 milliSiemens/centimeter and a critical current density (CCD) equal to 1.8 milliamps/square centimeter.

15. The battery cell of claim 14, wherein the battery cell is configured as a lithium-ion solid-state battery; and wherein the separator is the oxysulfide solid-state electrolyte.

16. The battery cell of claim 14, wherein the battery cell is configured as a lithium metal solid-state battery; and
    wherein the separator is the oxysulfide solid-state electrolyte.

17. The battery cell of claim 14, wherein the anode includes graphite, silicon, silicon oxide ($SiO_x$), or a blend thereof.

18. The battery cell of claim 14, wherein the cathode includes lithium nickel manganese cobalt oxide (NCM), nickel cobalt manganese aluminum (NCMA), lithium iron phosphate (LFP), lithium ion manganese oxide (LMO), sulfur(S), iron sulfide ($FeS_2$), titanium disulfide ($TiS_2$), or a blend thereof.

* * * * *